United States Patent
Wenzel et al.

(10) Patent No.: US 10,825,162 B2
(45) Date of Patent: Nov. 3, 2020

(54) METHOD FOR OBTAINING INFORMATION FROM X-RAY COMPUTED TOMOGRAPHY DATA FOR OPTIMIZING THE INJECTION-MOULDING PROCESS OF SHORT-FIBRE-REINFORCED PLASTIC PARTS

(71) Applicant: YXLON INTERNATIONAL GMBH, Hamburg (DE)

(72) Inventors: Thomas Wenzel, Hamburg (DE); Jeremy Simon, Ann Arbor, MI (US)

(73) Assignee: YXLON INTERNATIONAL GMBH, Hamburg (DE)

( * ) Notice: Subject to any disclaimer, the term of this patent is extended or adjusted under 35 U.S.C. 154(b) by 49 days.

(21) Appl. No.: 16/385,492

(22) Filed: Apr. 16, 2019

(65) Prior Publication Data
US 2019/0325570 A1    Oct. 24, 2019

(30) Foreign Application Priority Data
Apr. 24, 2018   (DE) .......................... 10 2018 109 819

(51) Int. Cl.
*G06T 7/00* (2017.01)
*G01N 23/046* (2018.01)

(52) U.S. Cl.
CPC ......... *G06T 7/0004* (2013.01); *G01N 23/046* (2013.01); *G01N 2223/623* (2013.01);
(Continued)

(58) Field of Classification Search
CPC ............... G06T 7/0004; G06T 2200/04; G06T 2207/10081; G06T 2207/20084; G01N 23/046; G01N 2223/623
See application file for complete search history.

(56) References Cited

U.S. PATENT DOCUMENTS

| | | | |
|---|---|---|---|
| 7,991,214 B1 * | 8/2011 | Choi ..................... | G06T 7/0004 382/141 |
| 9,721,334 B2 * | 8/2017 | Chen .................... | G06K 9/4628 |

(Continued)

OTHER PUBLICATIONS

Tudor et al, "Computer Tomography Investigation of Defects in Plastic Material Plates", 2012, Materiale Plastice, 49, No. 2, pp. 123-128 (6 pages) (Year: 2012).*

*Primary Examiner* — David F Dunphy
(74) *Attorney, Agent, or Firm* — Abelman, Frayne & Schwab

(57) ABSTRACT

Method for obtaining information from short-fibre-reinforced plastic components sequentially produced by an X-ray computed tomography. A learning phase includes: generating CT data sets for a random sample of plastic components from a production process; extracting at least one defect-free region of the plastic components; determining characteristic feature(s) in the extracted regions, relevance of individual features, and regions which are characteristic of the plastic component type and production process thereof, over a predetermined period of the plastic components productions, which exhibit considerable characteristic differences between good parts and reject parts; and defining the feature(s) with its characteristic as trained classifier. An application phase includes: generating a CT data set of the plastic component for inspection; classifying the inspection part based on the trained classifier; examining the characteristic of the feature(s) for a negative trend; and automatically provide a negative trend alert and/or change process parameters to counteract the negative trend.

9 Claims, 3 Drawing Sheets

(52) U.S. Cl.
CPC ...... *G06T 2200/04* (2013.01); *G06T 2207/10081* (2013.01); *G06T 2207/20084* (2013.01)

(56) References Cited

U.S. PATENT DOCUMENTS

2017/0256048 A1\* 9/2017 Flessner .................. G06T 19/20
2019/0197679 A1\* 6/2019 Fang ..................... G06N 3/0454
2020/0074609 A1\* 3/2020 Kotila .................... B33Y 50/00

\* cited by examiner

METHOD FOR OBTAINING INFORMATION FROM X-RAY COMPUTED TOMOGRAPHY DATA FOR OPTIMIZING THE INJECTION-MOULDING PROCESS OF SHORT-FIBRE-REINFORCED PLASTIC PARTS

CROSS REFERENCE TO RELATED APPLICATION

This application claims priority to German patent application number DE 10 2018 109819.7, filed on Apr. 24, 2018, the content of which is incorporated by reference herein in its entirety.

FIELD OF THE INVENTION

The present invention relates to a method, with a learning phase and a subsequent application phase, for obtaining information from short-fibre-reinforced plastic components which are produced in series by means of an X-ray computed tomography method, in order to optimize the production process and to reduce rejects using this information.

BACKGROUND OF THE INVENTION

The methods used until now for evaluating and controlling a production process with various process parameters using computed tomography data rely exclusively on information which is obtained from defects or discontinuities which can be detected in the CT data set of the component. These are observations which are compiled in each case from individual evaluations and therefore do not produce a relationship between the plastic components manufactured in the series (population). In addition, it is to be noted that the largest portion of the data obtained, in particular in the case of computed tomography (CT), is not incorporated into the evaluation at all. This portion is all the regions in the plastic component which are free from discontinuities and defects. In the field of CT this is typically 90-95% of the data which accrue during the inspection. In the case of defect-free plastic components, with these known methods, no further information accrues other than the information that the plastic component is okay.

X-ray CT enables the three-dimensional representation, in particular of internal structures, of plastic components examined using this method. The internal structure of components varies as a consequence of many influences on the process, which can be reflected in structural changes. These changes differ in nature depending on the manufacturing process and on the materials or combinations of materials being used. Depending on the characteristic of the change, these are acceptable in wide ranges, but can be visualized by the X-ray CT. The plastic components according to the invention are reinforced with short fibres.

SUMMARY OF THE INVENTION

The object of the present invention is therefore to provide a method which makes it possible to inspect such plastic components, in which discontinuities which lead to the rejection of the produced components are avoided and variations and above all trends in the production process can be detected at an early stage.

This object is achieved according to the invention by a method with the features of claim 1. Advantageous embodiments are specified in the dependent claims.

According to these, the object is achieved by a method, with a learning phase and a subsequent application phase, for obtaining information from short-fibre-reinforced plastic components which are produced in series by means of an X-ray computed tomography method, wherein the learning phase comprises the following steps:
  generating CT data sets for a qualified random sample of plastic components produced by means of a production process;
  extracting at least one defect-free region of the plastic components;
  determining the characteristic of at least one feature in the extracted regions as well as the relevance of individual features and regions which are characteristic of the type of plastic component and the production process thereof and which, over the course of time of the production of the plastic components, exhibit considerable differences [ . . . ] their characteristic between good parts and reject parts;
  defining this at least one feature together with its characteristic as trained classifier;
wherein the application phase comprises the following steps:
  generating a CT data set of the plastic component to be inspected;
  classifying the inspection part based on the trained classifier;
  examining the characteristic of the at least one feature for the presence of a negative trend with respect to this feature in comparison with the plastic components in the defect-free region previously examined;
  automatically changing the process parameters in a manner which counteracts the negative trend or giving a warning that this negative trend is present.

In the learning phase, CT data sets of a qualified random sample are generated, i.e. a series of plastic components for which the sequence in which they were produced is known. A feature profile of the plastic component production process is then determined, wherein the production process is low in defects or defect-free. This is effected with the aid of the random sample, wherein the distribution of the fibre orientation is used as feature. A defect-free region of the plastic components is then extracted. This is followed by the calculation/determination of the distribution of the fibre orientation (=characteristic) together with its trends as trained classifier.

The subsequent application phase begins with generating a CT data set of the plastic component to be inspected followed by classifying the inspection part based on the trained classifier. The evaluation is then carried out as to whether the features or their characteristic prove the presence of a negative trend. If this is the case, the process parameters are automatically changed in a manner which counteracts the negative trend. Alternatively or additionally, a warning of the detected negative trend is effected, so that the operator can counteract this negative trend by changing one or more process parameters.

According to the invention, there is thus the possibility to intervene in the process and thus the production of reject components can be prevented. A prediction of process behaviour with a corresponding proactive reaction is thereby possible.

An advantageous development of the invention provides that the at least one feature comes from the following group: distribution of the fibre orientation; local entropy, in particular Shannon entropy; local intensity distribution, in particular mean, variance or standard deviation; local wall thickness; geometric features, in particular lengths, diameters or distances. Several of the above-named features can also be used. A redundancy is thereby achieved and a negative trend is detected with even greater certainty at a very early stage, with the result that it can be counteracted earlier. The same also applies in the event that features other than those named above are used.

A further advantageous development of the invention provides that the evaluation is carried out as to whether the characteristic features of a negative trend are present only at selected points in the CT data set and only in a volume that can be predetermined, in particular in a cube around the respective point as central point. The edge length is preferably dependent on the resolution of the CT data. The edge length can be chosen such that the relevant features can be imaged well, it is for example double the fibre length; this can be 32 voxels, for example. The amount of volume data to be considered is thereby reduced for later steps, which leads to an acceleration of the process. The value that can be predetermined is determined during the learning phase.

A further advantageous development of the invention provides that it is investigated whether the characteristic feature corresponds to the distribution of good parts and reject parts learned during the learning phase. For the feature of the fibre orientation a criterion could be whether it exhibits a change of direction which results in the formation of swirls. Preferably the change of direction is determined here in that, for any desired points in the plastic component, the orientation of the fibres in the space is determined and the frequency of each direction is calculated for an environment that can be predetermined in each case. This can be quantified very well since a mathematical determination using simple means is possible.

A further advantageous development of the invention provides that not only a defect-free region, but also at least one defect-prone region is extracted in the learning phase, and an examination of the characteristic features for the presence of a negative trend with respect to these characteristic features in comparison with the plastic components in the defect-prone region previously examined is effected. The significance of characteristic features can be increased by the inclusion of defect-prone regions.

A further advantageous development of the invention provides that the steps of the application phase are either carried out for every plastic component or only for a random sample of these. In the first case an uninterrupted examination is guaranteed and a looming negative trend is detected at a very early stage. In the second case more time is available for the examination of an individual component, which can be utilized for a more detailed examination. The reliability of the trend detection can thus be increased.

BRIEF DESCRIPTION OF THE DRAWINGS

Further details and advantages of the invention are now to be explained in more detail with reference to an embodiment example represented in the drawings.

There are shown in.

DETAILED DESCRIPTION OF THE INVENTION

Figure 1:
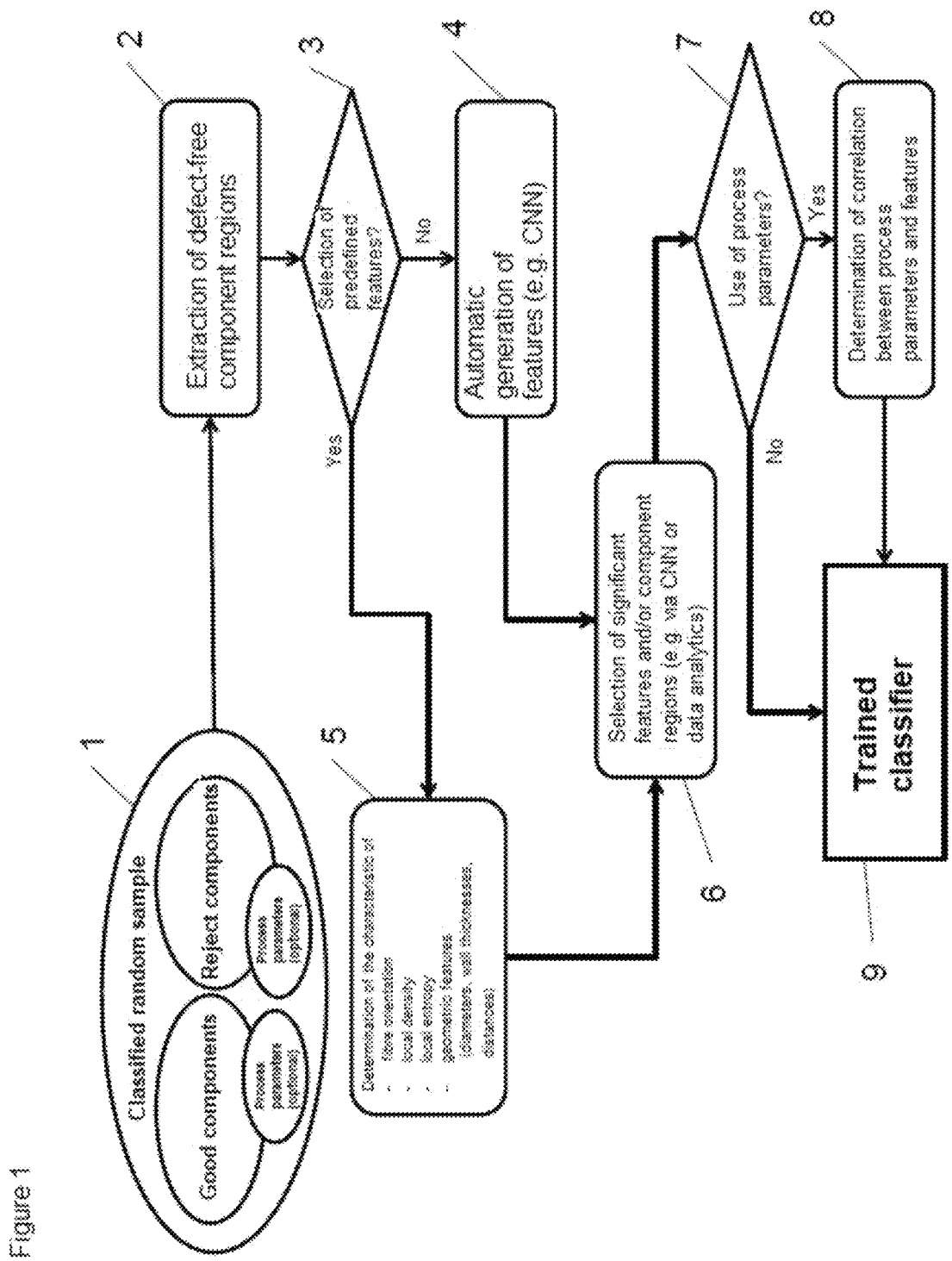
FIG. 1 a flow diagram of a learning phase according to the invention.

In FIG. 1, the principle flow of a method according to the invention in the learning phase is represented. This learning phase is explained in more detail in the following.

For isolation of the features, first of all a classified random sample is necessary (step no. 1), i.e. in the case of a simple two-class problem a subdivision for example into the classes "good" and "bad". However, it is also possible to solve problems which work with more than two classes. The random sample must have an adequate number of elements. The number of elements depends on the complexity of the classification task and can produce good results with a few hundred elements; in individual cases, however, a volume of millions of (partial) data sets may also be necessary. Each element must be clearly assigned to a class so that the classification system can be trained.

In step no. 2, defect-free component regions are extracted. On the basis of the quality criteria which are defined for the component to be examined in each case, regions in the component can be excluded. If, for example, porosities are decisive for the component quality, component regions which contain porosities are not used for the isolation of the features.

Further quality criteria in addition to the pore size can e.g. be: geometric deviations from the specified size or the drawing specifications (CAD); cracks in the component; separation of material constituents; shrinkage holes; foreign body inclusions.

The extraction of defect-free component regions can be effected manually, wherein the operator decides visually whether an extracted region is defect-free or not. An automatic extraction and evaluation is likewise possible since for all of the quality criteria described automatic image processing methods exist which can detect defects. Thus, a method for extracting defect-free component regions could be designed such that regions are extracted from the volume data set of the component in a stepwise manner and are evaluated using an image processing method. If defects are detected, this region is discarded and not used for the training. Regions which are not rejected through the image processing are incorporated into the training or the application.

In step no. 3 it is queried whether a selection of predefined features is to be effected.

If the answer to this is no—in accordance with step no. 4—neural networks or machine learning approaches offer the possibility, on the basis of the classified random sample, to automatically determine features which demonstrate a correlation between the inspection decision made for the component and structural properties of the component interior in the previously extracted defect-free component regions. In the case of such approaches, models such as multiple instance learning are used, among others, in order to maximize the learning success.

In contrast, if the answer to the question in step 3 is yes, in accordance with step no. 5, predefined features are provided. For this purpose, conventional statistical methods from the field of data analytics can be used to identify the features which produce the above-described correlation. It is a prerequisite that these features are selected in advance. This can be effected either manually by experienced image processing specialists or through automated processes which are used in image processing—e.g. by means of genetic programming. In the case of the fibre-reinforced plastic components, these include for example the determination of the characteristic of fibre orientation, local density, local entropy or geometric features, such as diameters, wall thicknesses or distances.

Next, in accordance with step no. 6—following step no. 4 or 5—a selection of significant features and/or component regions is effected. This can be effected e.g. via neural networks or data analytics. In addition to the type of the features, such as e.g. local density distributions, orientations of fibres or local wall thickness variations, the position in the component in which the characteristic feature is determined can also be important in order to demonstrate the above-described correlation. The limitation of one or more features to particular zones/regions of a component can contribute to the significance of the features.

In step no. 7 it is queried whether additional environmental data in the form of process parameters are to be fed into the training of the classification system.

If the answer to this is yes, in step no. 8 the correlation between the process parameters and the characteristic feature is determined. This is in turn effected using neural networks or data analytics. If the features which ultimately make an assessment of the process quality possible are identified, the task set in this step is to find matches between particular process parameters and the characteristic of features. For example, through the analysis it can be established that, in the case of high pressures, particular features assume specific values or form patterns. A correlation between a characteristic feature and one or more process parameters is thereby produced. If this characteristic feature were to be detected during operation, regulation of the pressure can be introduced as a countermeasure, for example.

Following step no. 8—or directly if the answer to the question in step no. 7 is no—a trained classifier is established in step no. 9. When the learning process is completed, for example when a neural network is used, a trained network is present (filter settings and weightings for each neuron in the network). This network with its parameters represents the classifier. In the case of predefined features, it is the characteristic features significant for each class (optionally also relative to the positions in the component at which the feature is evaluated) which represent the trained knowledge of the classifier.

Figure 2:
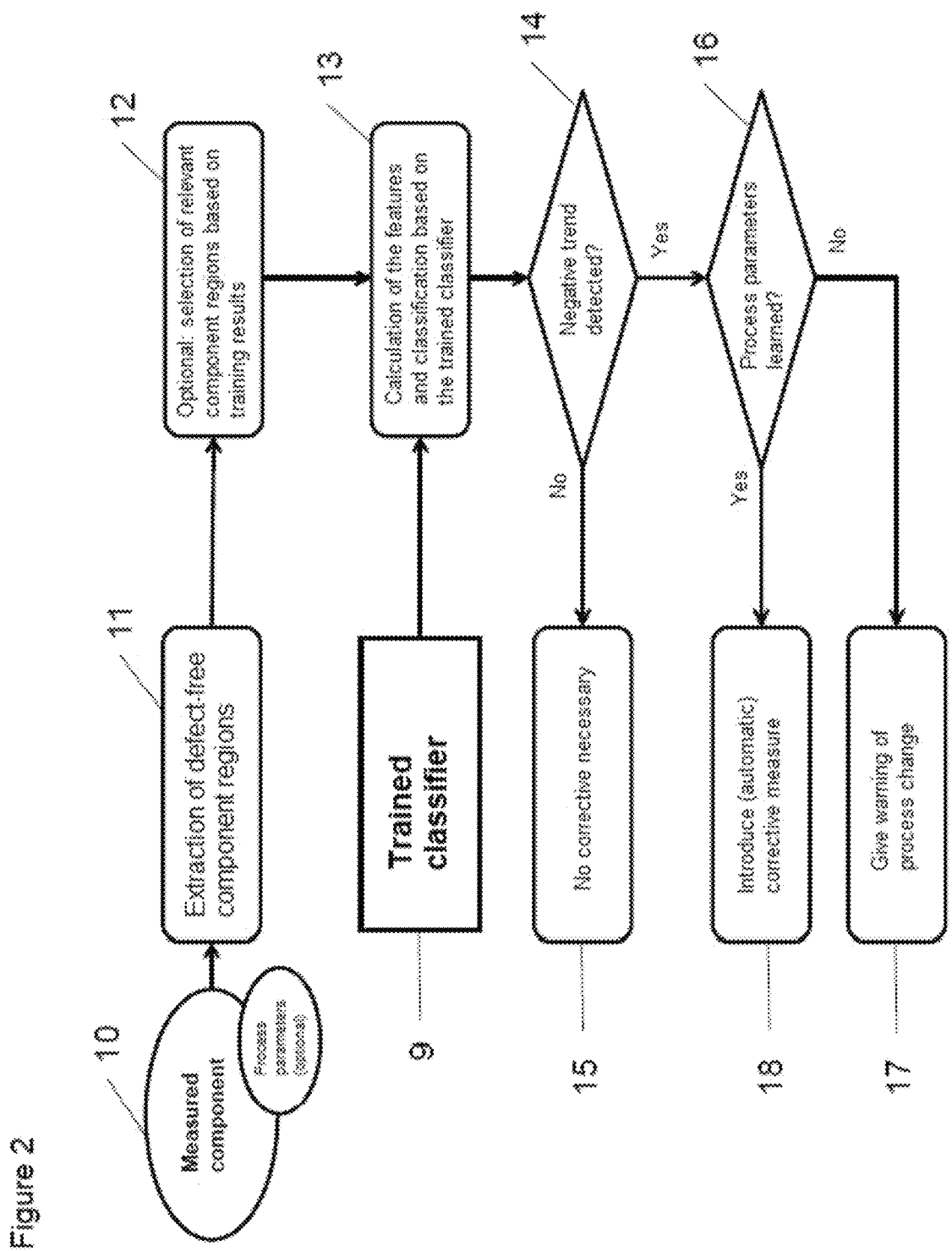
FIG. 2 a flow diagram of an application phase according to the invention after carrying out the learning phase, FIG. 3 a region of a sectional image of a first fibre-reinforced plastic component with discontinuities and FIG. 4 a region of a sectional image of a second fibre-reinforced plastic component without discontinuities.

In FIG. 2, the principle flow of a method in the application phase is represented, which is explained in more detail in the following.

If the significant features, the specific characteristics thereof and optionally the local relevance thereof are selected through the above-described method of the learning phase (step no. 9), these are used in normal operation—series inspection. Here, either every component (inline operation) or a relevant random sample (e.g. every tenth component) is examined using X-ray CT in accordance with step no. 10.

Defect-free component regions are extracted in accordance with step no. 11 in analogy to the training.

Optionally, a selection of relevant component regions can also be effected in accordance with step no. 12, based on the results of the learning phase.

By means of the trained classifier previously established in the learning phase in accordance with step no. 9, in step no. 13 a calculation of the features and classification is then performed. For this purpose, the previously identified features are evaluated in the possibly relevant component regions. The sum of the individual results (each feature in the various evaluated component regions) is in turn evaluated using a classification method (for example using a neural network) and, in accordance with step no. 14, a decision is made as to whether a negative trend is detected.

This decision is, in accordance with step no. 15, an indication for the operator that no corrective is necessary if a negative trend was not detected in step no. 14.

If a negative trend was detected in step no. 14, in accordance with step no. 16 a query is effected as to whether process parameters were learned.

In the simplest case—if the answer to this is no—in accordance with step no. 17 a warning of a process change is given. This means that the process demonstrates a trend which makes the production of rejects more likely.

If learned process parameters are present, the answer to the query of step no. 16 is yes and a correlation between the features which can predict the occurrence of discontinuities and potential causes can additionally be demonstrated. Such environmental data can be primary influencing factors such as parameters of the production machine (pressures, temperatures, stresses, flows), but also secondary influencing factors such as e.g. ambient temperatures, air humidities and operators. Decisive for finding the features in the learning phase is that the significance is detected over the course of time of the production of the components. Conclusions on the process behaviour and the detection of trends, which is ultimately a prerequisite for proactive action to avoid rejects, are only possible over time.

In the event that additional environmental parameters are involved, in accordance with step no. 18 the method is used to engage in the process automatically and identified process parameters (e.g. pressures) are changed via the classification system. The negative trend of the production process is thereby counteracted and the formation of reject parts is already prevented in advance.

Figure 4:
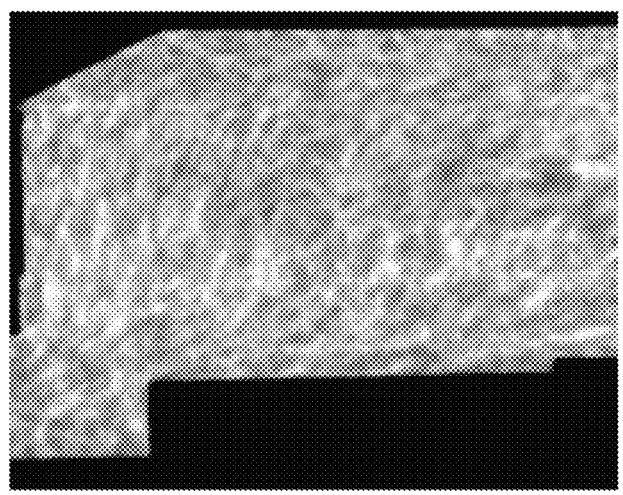
Figure 3:
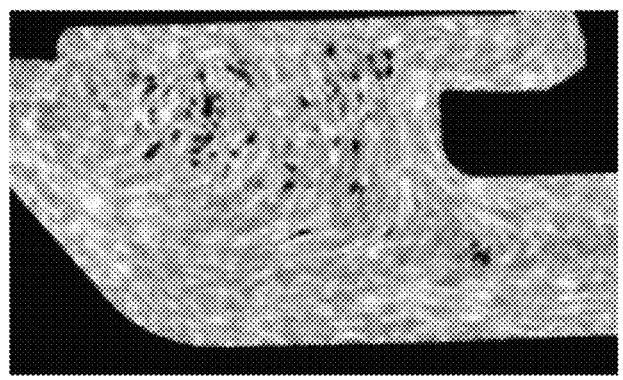

The materials used in the production of short-fibre-reinforced plastic components promote the visualization of internal structures and thus also the changes thereof from plastic component to plastic component with the aid of computed tomography. This is due to the different X-ray absorption coefficients of the materials used. FIG. 3 shows by way of example a section through a CT data set, which was made of a glass-fibre-reinforced plastic component. The section shows a region which is very largely permeated with pores, i.e. discontinuities. In addition, it is clearly visible that the fibre orientation (fibres are recognizable as light structures) in the broader surroundings of the pores exhibits a strong change in direction with a tendency towards the formation of swirls. In FIG. 4, a region can be seen which is free from discontinuities. In fact, changes in the fibre orientation can also be seen here which, however, are not so pronounced as in FIG. 3. These structures can be mathematically conceived and described. For any desired point in such an object, the orientation of the fibres in the space can be determined and the frequency of each direction calculated for a predetermined environment.

This distribution of the fibre directions represents one of the essential features, which is necessary for use of the method described here. The characteristic of this feature (orientations, histogram of the distribution), which makes it possible to detect a trend, can be determined via a learning phase according to the invention. From the random sample which is fed into the method according to the invention, a profile of the course of the process which tends to be defect-free or at least low in defects (theoretical profile) can be determined with the aid of the features. In addition, it is possible to derive a profile which is defect-prone. During production monitoring through evaluation of every plastic component (inline inspection) or also by way of a random sample (e.g. every tenth component), a deviation from the theoretical profile can be detected and countermeasures can be taken.

In addition to the distribution of the fibre orientation in the space, further features are also relevant for the production process and the monitoring thereof, which are described in the following and form part of the application-specific method. The individual characteristic of the features depends both on the geometry of the plastic components and on the position in the plastic component at which the feature is determined. Thus it is e.g. possible that in the region of a material accumulation a completely different characteristic of the feature is relevant for trend detection than in a thin-walled region.

It applies to all features that they need to be determined only for selected points in the data volume and are evaluated only in a predetermined environment (e.g. cube around a central point with an edge length of 32 voxels). In addition to the characteristic of the features, the number and position of the points to be evaluated are also determined via the learning phase according to the invention. As already described above, one and the same feature can have different characteristics in dependence on the position in the plastic component in order to achieve the object.

A (non-definitive) list of the features necessary for trend analysis in short-fibre-reinforced plastic injection moulding follows:
  distribution of the fibre orientation (histogram), as described above;
  local entropy (e.g. Shannon entropy);
  local intensity distribution (e.g. mean, variance, standard deviation);
  local wall thickness;
  geometric feature (e.g. lengths, diameters, distances).

The invention can thus be summarized as follows:

The aim of the method according to the invention is not to detect the exceeding of limits in relation to unacceptable discontinuities, but to use variations from plastic component to plastic component which are within acceptable ranges to control the process. The method requires a series inspection using computed tomography. Thus, for each inspected plastic component a 3D data set is produced, which reproduces the internal structure of an injection-moulded component. Through inspection of the series, it is possible in principle to detect changes in the injection-moulding process. Trends which also have a predictive character are thereby visualized. It thus becomes possible to predict changes in the process and thus to counteract deteriorations in the process through an intervention.

It is an essential part of the method that information is obtained exclusively from the component regions which are free from discontinuities or defects. Depending on the component characteristic and process variant, there are various features which can demonstrate a correlation with component quality and process quality.

The decisive difference between the invention and methods from the state of the art is that it relies primarily only on information which is obtained from defect-free regions of the component. To increase the significance of characteristic features it is also possible, however, additionally to use information from defect-prone regions. Methods which derive the information from the defects of a component cannot obtain any meaningful information in the sense of process evaluation and process influencing from defect-free components. Since, however, trends can also become visible in the case of defect-free plastic components, there is a monitoring gap in the case of the methods according to the state of the art. A zero-defect production is thus not possible since defects are always necessary for information to be obtained. Such methods are thus exclusively reactive. In contrast to this, the method according to the invention described here is proactive since it does not require any defect-prone components to trigger an action in the application phase.

What is claimed is:

1. A method, with a learning phase and a subsequent application phase, for obtaining information from short-fibre-reinforced plastic components which are produced in series by means of an X-ray computed tomography method, wherein the learning phase comprises the following steps:
  a) generating CT data sets for a qualified random sample of plastic components produced by means of a production process;
  b) extracting at least one defect-free region of the plastic components;
  c) determining the characteristic of at least one feature in the extracted regions as well as the relevance of individual features and regions which are characteristic of the type of plastic component and the production process thereof and which, over the course of time of the production of the plastic components, exhibit considerable differences in their characteristic between good parts and reject parts;
  d) defining this at least one feature together with its characteristic as trained classifier;
wherein the application phase comprises the following steps:
  e) generating a CT data set of the plastic component to be inspected;
  f) classifying the inspection part based on the trained classifier;
  g) examining the characteristic of the at least one feature for the presence of a negative trend with respect to this feature in comparison with the plastic components in the defect-free region previously examined;
  h) automatically changing the process parameters in a manner which counteracts the negative trend or giving a warning that this negative trend is present.

2. The method according to claim 1, in which it is investigated whether the characteristic feature corresponds to the distribution of good parts and reject parts learned during the learning phase.

3. The method according to claim 1, in which the at least one feature comes from the following group: distribution of the fibre orientation; local entropy, in particular Shannon entropy; local intensity distribution, in particular mean, variance or standard deviation; local wall thickness; geometric features, in particular lengths, diameters or distances.

4. The method according to claim 3, in which the feature of the distribution of the fibre orientation is then examined as to whether it exhibits a change of direction which results in the formation of swirls.

5. The method according to claim 4, in which the change of direction is determined in that, for any desired points in the plastic component, the orientation of the fibres in the space is determined and the frequency of each direction is calculated for an environment that can be predetermined in each case.

6. The method according to claim 1, in which step g is carried out only at selected points in the CT data set and only in a volume that can be predetermined, in particular in a cube around the respective point as central point.

7. The method according to claim 6, in which the edge length depends on the resolution of the CT data, in particular such that the relevant features can be imaged well.

8. The method according to claim 1, in which, in addition to steps c and d, not only a defect-free region, but also at least one defect-prone region is extracted in the learning phase, and an examination of the characteristic features for the presence of a negative trend with respect to these characteristic features in comparison with the plastic components in the defect-prone region previously examined is effected.

9. The method according to claim 1, in which the steps of the application phase are carried out either for every plastic component or only for a random sample of these.

* * * * *